United States Patent [19]

Ziv et al.

[11] Patent Number: 4,513,370
[45] Date of Patent: Apr. 23, 1985

[54] DATA TRANSFER CONTROL SYSTEM AND METHOD FOR A PLURALITY OF LINKED STATIONS

[75] Inventors: Pinhas Ziv, Supelveda; Yiu-Keung Ng, Monterey Park, both of Calif.

[73] Assignee: Amdahl Corporation, Sunnyvale, Calif.

[21] Appl. No.: 399,240

[22] Filed: Jul. 19, 1982

[51] Int. Cl.³ ............................................ G06F 15/16
[52] U.S. Cl. ..................................................... 364/200
[58] Field of Search .............................. 364/200, 900

[56] References Cited

U.S. PATENT DOCUMENTS

| | | | |
|---|---|---|---|
| 3,480,914 | 11/1969 | Schlaeppi | 364/200 |
| 4,099,233 | 7/1978 | Barbagelata et al. | 364/200 |
| 4,209,840 | 6/1980 | Berardi et al. | 364/200 |
| 4,223,380 | 9/1980 | Antonaccio et al. | 364/200 |
| 4,388,686 | 6/1983 | Haid | 364/200 |
| 4,418,386 | 11/1983 | Vrielink | 364/200 |

*Primary Examiner*—Gareth D. Shaw
*Assistant Examiner*—Jameson Lee
*Attorney, Agent, or Firm*—Fliesler, Dubb, Meyer & Lovejoy

[57] ABSTRACT

System and method for controlling the transfer of data between a plurality of processors in a network. Synchronization between the processors is effected by means of asynchronously operated address counters which control the transmission of data from the processors. When a transmission occurs, the address counters are all set to a count corresponding to the address of the transmitting station, and in the event of a transmission from more than one processor, the address counters are reset to an initializing level. A station is permitted to transmit only when the count in its address counter corresponds to the address of the station.

6 Claims, 7 Drawing Figures

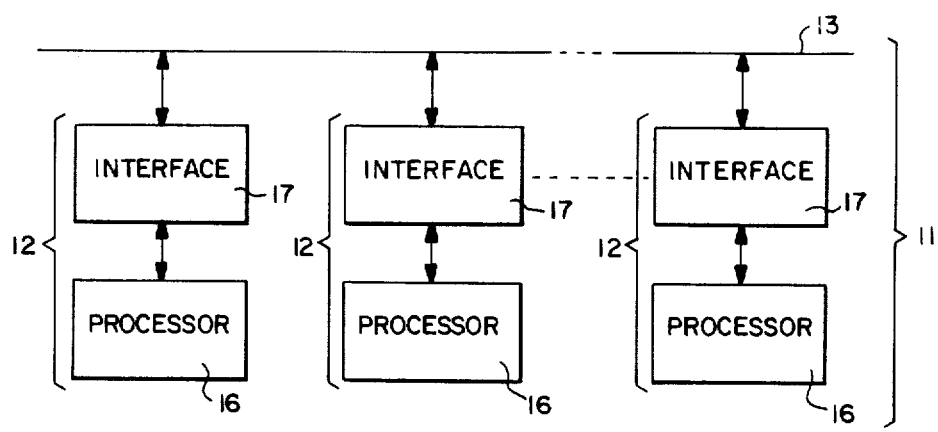
FIG. —1
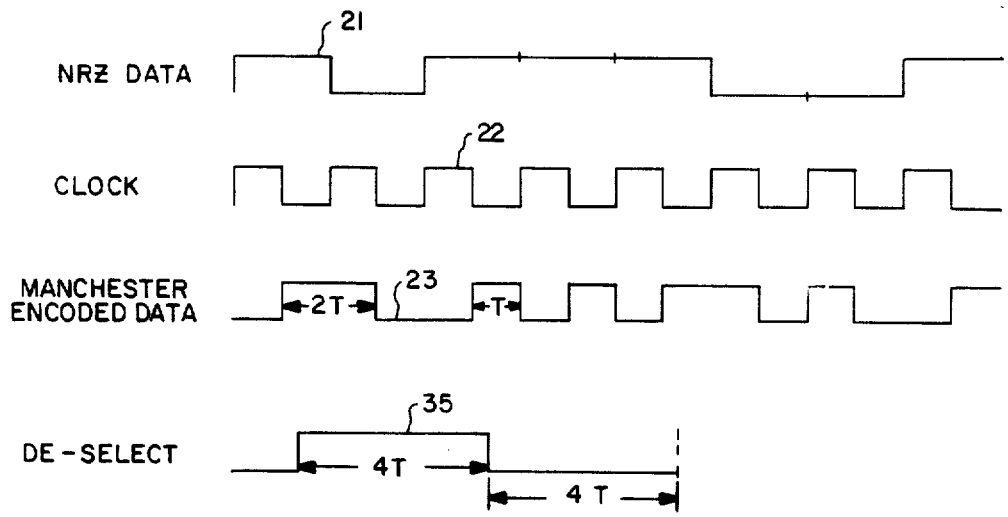
FIG. —2
FIG. —3

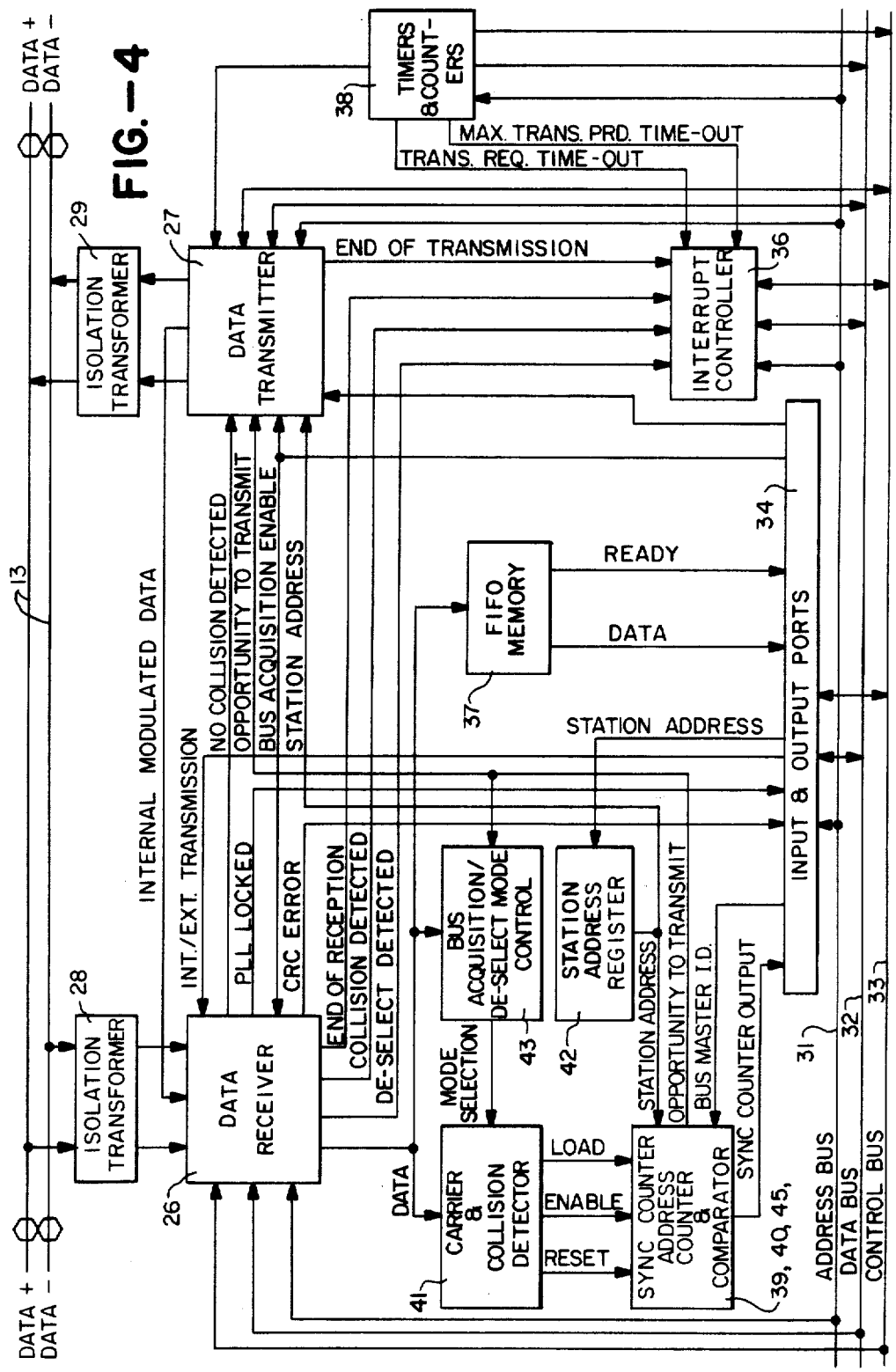

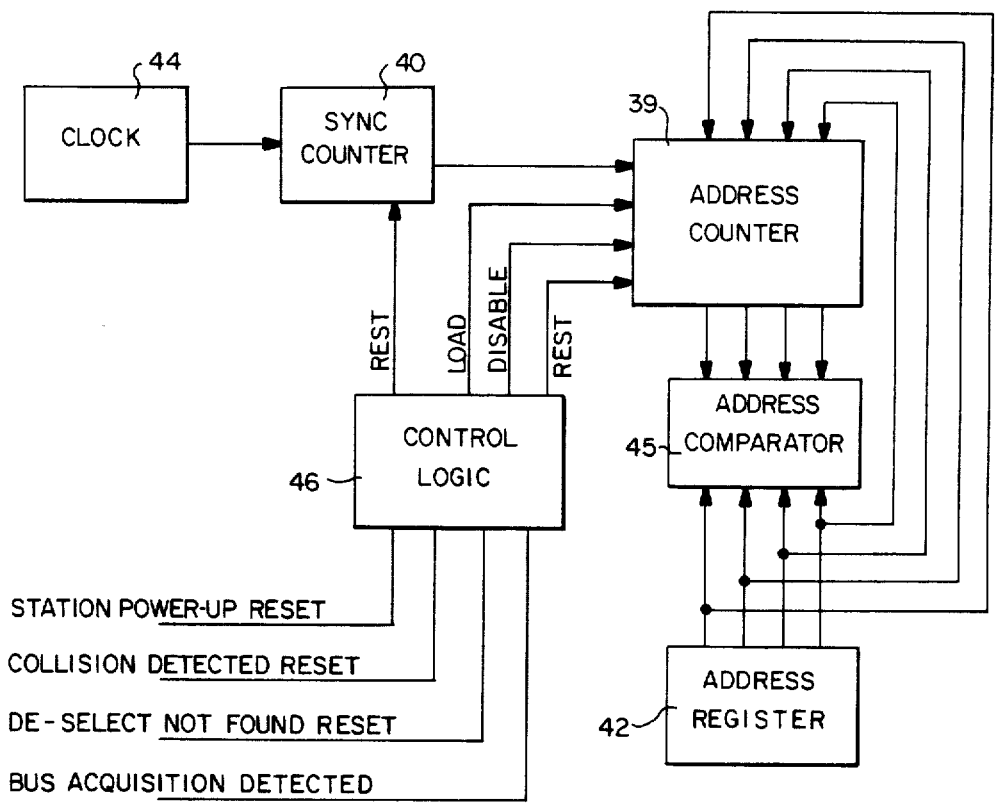
FIG.—5
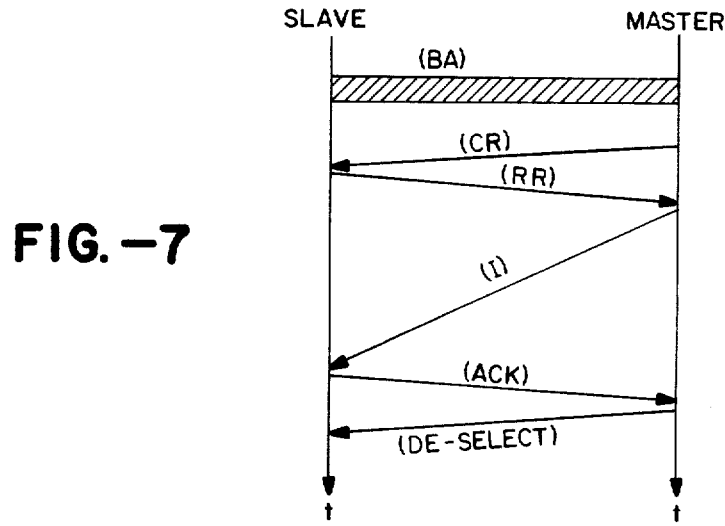
FIG.—7

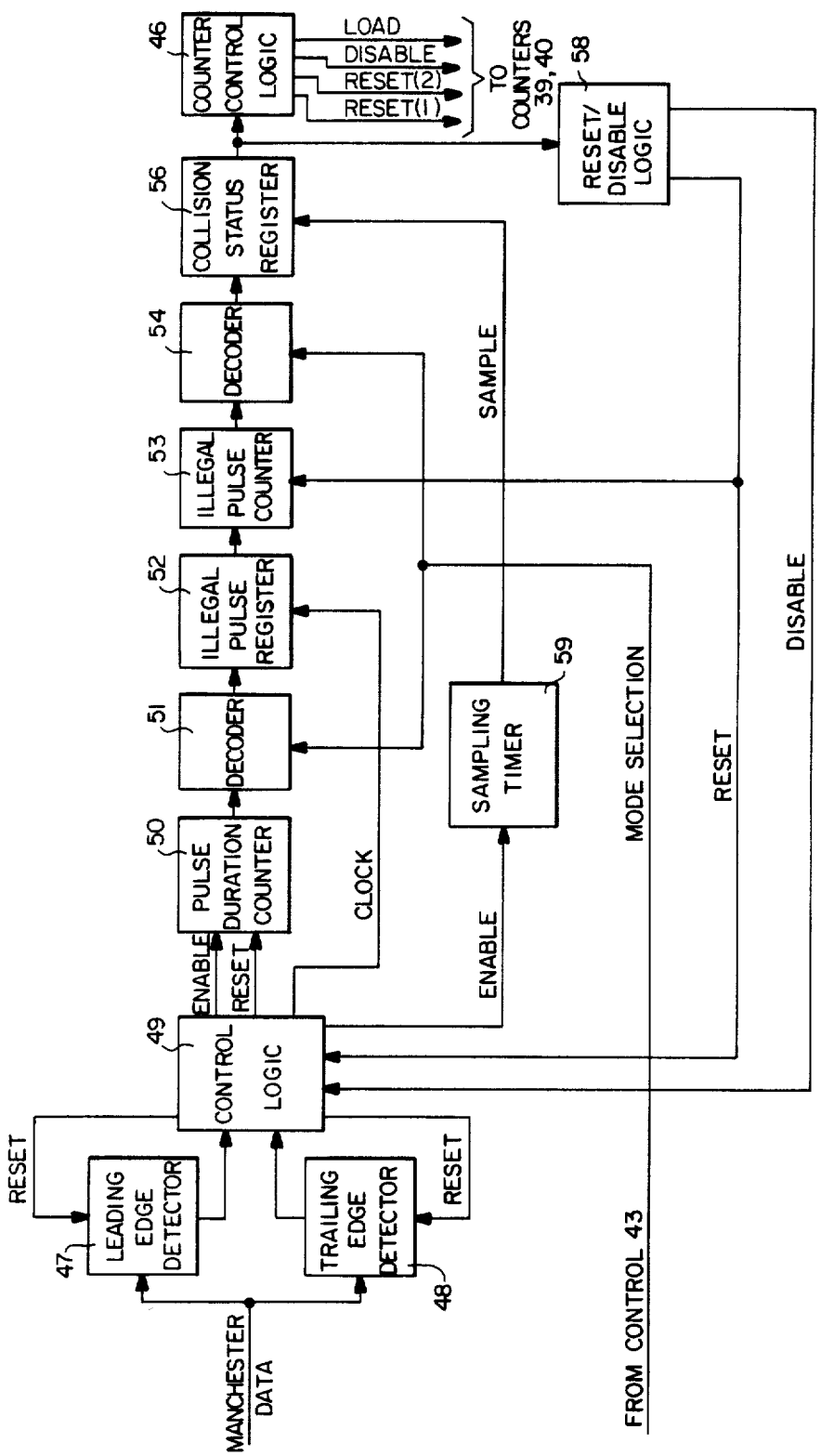
FIG.—6

DATA TRANSFER CONTROL SYSTEM AND METHOD FOR A PLURALITY OF LINKED STATIONS

FIELD OF THE INVENTION

This invention pertains generally to the transmission of data, and more particularly to a system and method for selectively controlling communication or data transfer between a plurality of processors in a network.

BACKGROUND OF THE INVENTION

In a computer network, a plurality of processors at geographically separated locations are interconnected by a suitable data link such as a telephone line, or a dedicated line. The processors may be communication processors, business processors or any other processors which communicate with each other over the data link to provide a geographically distributed processing capacity.

Generally speaking, in such networks the data link can only accommodate data from one of the processors at a time, and some means must be provided to control communication between the different processors and give them all suitable access to the data link. Synchronization between the processors is difficult due to transmission line effects of the data link, e.g. propagation delays.

It is in general an object of the invention to provide a new and improved system and method for controlling the transfer of data between a plurality of processors in a network.

Another object of the invention is to provide a system and method of the above character in which synchronization between the processors is effected without transmitting synchronization information over the data link.

Another object of the invention is to provide a system and method of the above character in which each of the processors in the network has substantially equal access to the data link.

SUMMARY OF THE INVENTION

These and other objects are achieved in accordance with the invention by providing a data transfer system and method in which asynchronously operated address counters are provided at transmitting and receiving stations interconnected by a data link. In the absence of data on the link, each of the address counters is advanced periodically in response to a local address counter clock. Each of the stations is assigned a unique address, and a transmitter is permitted to transmit data over the link only when the count in the local address counter matches the address of the station. At the outset of each transmission, an address is transmitted, and the address counters at the other stations are set to a count corresponding to this address. In the event that data is transmitted from two or more stations at any given time, the transmissions are terminated, and the address counters at all of the stations are reset to an initializing level.

BRIEF DESCRIPTION OF THE DRAWINGS

FIG. 1 is a block diagram of a computer network incorporating the data transfer system and method of the invention.

FIG. 2 illustrates one format for data transferred in the network in FIG. 1.

FIG. 3 is a waveform diagram illustrating the coding of data in the network of FIG. 1 and the format of a DE-SELECT signal which is transmitted at the conclusion of a data transmission.

FIG. 4 is a functional block diagram of one of the interface modules in the network of FIG. 1.

FIG. 5 is a functional block diagram of the synchronization and address counters and the address comparator in the interface module of FIG. 4.

FIG. 6 is a functional block diagram of the carrier and collision detector in the interface module of FIG. 4.

FIG. 7 is a timing diagram illustrating the protocol or sequence of communications by which data is transferred between two stations in the network of FIG. 1.

DETAILED DESCRIPTION

In the drawings, the invention is illustrated in connection with a network 11 comprising a plurality of transmitting and receiving stations 12 interconnected by a data link 13. Each of the stations includes a processor or computer 16 and an interface module 17 which controls communication between the processor and the data link. In one presently preferred embodiment, the data link comprises a bus line in the form of a twinaxial cable or twisted pair. Any suitable number of transmitting and receiving stations can be employed in the network, and by way of example a system having sixteen stations interconnected by a 2,500 foot twinaxial cable is described.

As illustrated in FIG. 2, the data is transmitted over the network in frames or packets of predetermined format. The first 16 bits (SYN) of each frame contain a binary bit pattern such as 1010101010101010 or 0101010101010101 for locking a phase locked loop which is utilized in demodulating received data. The next 8 bits (LOCK) contain the binary bit pattern 11111111 for indicating that the phase locked loop has achieved a locked condition. The next field (BYTE COUNT) indicates the number of 8-bit bytes of data to be transmitted in the frame. The fourth field (PACKET TYPE) identifies the frame as being either a control frame or a message frame. The fifth field (ADDRESS) contains the addresses of the transmitting station and the receiving station to which the transmission is directed. The message field (TEXT) of a message frame contains the message data to be transmitted, and the last field (CRC) contains a 16-bit frame check sequence bit pattern. In one presently preferred embodiment, the PACKET TYPE, ADDRESS and TEXT fields can contain a total of up to 300 bytes. However, it should be understood that any other suitable frame size and/or format can be utilized, if desired.

Prior to transmission over data link 13, the data is in a non-return-to-zero (NRZ) format, as illustrated by waveform 21 in FIG. 3. In this format, the data signal remains either high or low as long as bits of the same type (1 or 0) are transmitted in succession. For reasons discussed more fully hereinafter, the data is converted to a Manchester encoded format at the transmitting station before being sent out over the data link. For this purpose, a clock signal 22 having a 50% duty cycle and a suitable frequency, e.g. 2 MHz, is provided at the transmitting station and maintained in proper phase relationship with the transmitted NRZ data. This clock signal is combined with the NRZ data in a logical EXCLUSIVE-OR function to provide the Manchester encoded data, as illustrated by waveform 23 in FIG. 3. It will be noted that the Manchester data has only two valid pulse widths, namely T and 2T, where T is the width of each high or low pulse in the transmitting clock signal.

As illustrated in FIG. 4, the interface module 17 at each transmitting and receiving station includes a data receiver 26 and a data transmitter 27 which are coupled to data link 13 by isolation transformers 28, 29, respectively. This passive mode of coupling is advantageous in that individual interface modules can be removed or can fail to operate without bringing the entire system down. The receiver and the transmitter are also connected to the address bus 31, the data bus 32, and the control bus 33 of the processor or computer 16 with which the interface module is associated. The interface module also has input and output ports 34 through which the module communicates with the address, data and control buses of the processor.

Data receiver 26 includes a phase locked loop which generates a demodulator clock signal, and a data demodulator which converts the Manchester encoded data to NRZ data. The receiver also includes a CRC checker which checks the received data for errors at the end of each frame.

Data Transmitter 27 includes a carrier generator, a data modulator for converting NRZ data to Manchester data, and a data generator. The transmitter also includes a DE-SELECT generator which provides a known pattern not found in Manchester coding, e.g. a high pulse followed by a low pulse each having a width of 4T, as illustrated by waveform 35 in FIG. 3, at the end of each transmission. The transmitter also includes a CRC generator which provides a CRC-16 check run at the end of each transmission.

An interrupt controller 36 is connected to the address, data and control buses of the local processor and receives interrupt signals from data receiver 26 upon the end of reception, detection of a collision (i.e. the concurrent presence of data from two or more transmitters on the data link), and the detection of a DE-SELECT signal. The interrupt controller also receives interrupt signals from transmitter 27 at the end of a transmission and from timing circuits 38 when the transmission request time has expired and when the maximum allowed transmission time has expired.

Buffering of the received data between receiver 26 and the local processor is provided by a first-in, first-out (FIFO) memory 37, with the loading of data into the memory by the receiver and the unloading of data from the memory by the processor being done concurrently.

Data to be transmitted by data transmitter 27 is obtained from the local processor via address bus 31, data bus 32 and control bus 33, and the transmitter timing is controlled by timing and counting circuits 38.

An internal/external transmission control signal conditions receiver 26 for receiving either modulated data locally generated by transmitter 27 or data received over the data link from the same station or another station.

Means is provided at each of the transmitting and receiving stations for synchronizing the operation of the system without transmitting a synchronization signal over the data link. This means includes an address counter 39, a synchronization counter 40, a carrier and collision detector 41, an address register 42, and a bus acquisition and deselection mode control 43. The address counter is driven by the synchronization counter which is driven by a local clock 44, operating at a rate such that the time interval between successive pulses delivered to the address counter is greater than twice the propagation delay of the data link, plus the bus acquisition time, the transmitter response time, the receiver response time, and one period of the local synchronizing counter clock. The local clock operates at a higher rate than the address counter, and the clock signal is divided down to the rate desired for driving the address counter by the synchronization counter. The synchronization clocks at the different stations operate independently of each other, and hence the address counters are asynchronously driven. With a 2,500 foot bus line, the local address counters might, for example, be driven at a rate of one pulse every 28 microseconds, with the local clock operating is 16 times this rate.

Carrier and collision detector 41 monitors the Manchester encoded data from receiver 26 and controls the operation of local address counter 39 in such manner that this counter advances in response to the clock pulses in the absence of valid data on the data link. Upon detection of a collision (i.e. the presence of data from more than one transmitting station), the carrier and collision detector resets both the synchronization counter and the address counter to be an initial level, e.g. zero.

A unique address is assigned to each of the transmitting and receiving stations, and this address is stored in address register 42 for delivery to an address comparator 45 and to transmitter 27, as required. Comparator 45 compares the count in address counter 39 with the station address and delivers an enabling signal to the local transmitter when the count corresponds to the station address.

The operation of address counter 39 and synchronization counter 40 is controlled by logic circuits 46 which deliver control signals (e.g., RESET, DISABLE and LOAD) to the counters in response to the application of power to the station, the detection of a collision, the absence of a termination signal at the end of a transmission, and the successful acquisition of the data bus by one of the stations.

Bus acquisition and deselection mode control 43 controls the operation of collision and carrier detector 41 to reset synchronization counter 40 and to inhibit address counter 39 from advancing while received data is being processed even though no carrier or data signals are present on the data line at that time. In the acquisition mode, the station is free to acquire the bus line for purposes of transmitting data when the count in the address counter corresponds to the station address. In the deselection mode, i.e. when one of the stations has acquired the bus for purposes of transmission, the synchronization counter is reset to zero, and operation of the address counter is inhibited until a DE-SELECT signal is received to indicate the conclusion of a transmission.

As illustrated in FIG. 6, carrier and collision detector 41 comprises a leading edge detector 47 and a trailing edge detector 48 to which Manchester encoded pulses from data receiver 26 are applied. The outputs of the edge detectors are connected to a control logic circuit 49 which delivers ENABLE and RESET signals to a pulse duration counter 50. The weighted outputs of counter 50 are connected to a decoder 51, and the output of the decoder is connected to the input of a register 52. A clock signal from control logic circuit 49 is applied to register 52, and RESET signals are applied to edge detectors 47, 48 by the control logic. The duration of each pulse in the Manchester encoded data is monitored by counter 50 and decoder 51, and when the duration differs from the values normally found in Manchester encoded data (i.e., T or 2T), an illegal pulse signal is registered in register 52. An illegal pulse occurs, for example, when out-of-phase signals from two or more transmitting stations are present on the data link and combine to produce signals which, when decoded, contain pulses having widths other than those normally found in Manchester encoded data.

The output of register 52 is applied to the input of a counter 53 which advances in response to each illegal pulse detected, and the weighted outputs of this counter are connected to a programmable decoder 54. The output of decoder 54 is applied to a status register 56, and when the number of illegal pulses, or collisions, detected during a given transmission exceeds a predetermined level, decoder 54 delivers a COLLISION signal to register 56. Being programmable, decoder 54 can be adjusted to set the collision detection threshold in accordance with the network environment.

The output of collision status register 56 is applied to a logic circuits 46 and to a reset/disable circuit 58. Logic circuits 46 provide the ENABLE, RESET and LOAD signals which control the operation of counters 39 and 40, and reset/disable circuit 58 provides signals for resetting or disabling control logic circuit 49 in accordance with the signal from bus acquisition and de-select mode control 43. A timer 59 delivers a sampling pulse corresponding to the duration of a bus acquisition transmission to status register 56.

Operation and use of the system heretofore described, and therein the method of the invention, can now be described. At the outset, it is assumed that there is no activity on the data link, i.e. none of the stations is transmitting, and that the address counters 39 at the stations coupled to the data link are out of synchronization with each other. Each 28 microseconds the address counter at each station is advanced one count until the count at a station which is ready to transmit data corresponds to the address of that station. At that time, the transmitter at the station is enabled and begins to transmit a carrier for a period of time corresponding to three times the propagation delay of the data link, as indicated by the bus acquisition signal (BA) in the communication sequence illustrated in FIG. 6. The receivers at all of the stations, including the transmitting station, monitor the data link during ths period of time for additional transmissions from one or more of the other stations.

In the event that a collision (transmission from more than one station) is detected, at the end of the carrier transmission, the address counters and the synchronization counters at all of the stations are reset to an initializing level, e.g. zero, whereupon the entire system is synchronized. Thereafter, the counters at the individual stations again advance in response to their local clocks until the count at a station which is ready to transmit corresponds to the address of the station. That station then transmits its carrier as before, and with the counters synchronized there should be no further collision. If, however, another collision should occur (e.g. by the activation of another station whose counter has not yet been synchronized with the others), the synchronization cycle repeats until no further collision is detected.

Once a carrier is transmitted for the prescribed time without collision, the station transmitting the carrier acquires the data link for purposes of transmission and can thereafter be referred to as a master station. At all stations, including the master station, the synchronization counters are reset to zero and then disabled from advancing, and the address counters are disabled from advancing but not reset to zero. The master station then begins transmitting one frame or packet of data in the format illustrated in FIG. 2, beginning with the SYN bit pattern which synchronizes the phase locked loop at the receiving station for decoding the transmitted data. When the address of the master station is transmitted, a count which is one count greater than the master station address is stored in the address registers 42 at all of the stations in the network. Upon transmission of the address of the receiving station to which the transmission is directed, the receiver at that station is enabled to receive the transmitted data, and that station can thereafter be referred to as a slave station. The transmission of the slave station address serves as a call request (CR) signal in the communication sequence illustrated in FIG. 7, and upon receipt of this signal, the slave station returns a signal (RR) to the master station to indicate its readiness to receive the data packet.

At the completion of the information packet (I), the master station transmits the CRC checking signal, and upon receipt of this signal the slave station checks the received data. If an error free frame is detected, the slave station sends an acknowledgment signal (ACK) back to the master station, and upon receipt of this signal the master station transmits a termination signal (DE-SELECT) to all of the stations in the network, including the master station itself. Upon receipt of the DE-SELECT signal, the count stored in the address register at each station (i.e., the master station address plus one) is loaded into the address counter at each station, and the synchronization counters are once again enabled to advance in response to the local clock signals. The local address counters then advance in response to the divided down clock signals from the synchronization counters, and the network is thus re-synchronized. In the event that the termination signal is not received within a predetermined time after a transmission begins, the address and synchronization counters are reset to their initial levels, and the network is resynchronized as though a collision had occurred. In the event that an error is detected in the received data, the slave station signals the master station accordingly, and the frame is retransmitted.

If at any time during a transmission a collision is detected, the transmission is terminated, and the address counters at all of the stations in the network are reset to the initializing level. The synchronization cycle then begins again, with each station having an opportunity to transmit in its turn.

Prior to the time that transmission begins, all of the stations in the network are in a listening mode, with their address counters advancing periodically in the absence of data on the link. After a station transmits its address successfully (i.e., without collision) for the prescribed bus acquisition period, frame transmission begins, and the receivers enter a deselect mode in which advancement of the address counters is inhibited even though no data may be present on the data line at times. The receivers remain in this mode until the termination signal (DE-SELECT) is transmitted at the end of a session, and this allows the master station to retain control of the bus during the time the transmitted data is being checked by the slave station and there is no data on the bus. Upon transmission of the termination signal, all of the stations return to the listening mode in which any station can, in turn, acquire the bus for purposes of transmission.

When a new station enters the network, it remains in the listening mode for one complete synchronization cycle before it is permitted to acquire the bus for purposes of transmission, thereby minimizing the possibility of a collision. If at any time during that cycle one of the other stations makes a transmission or a collision occurs, the address counter of the new station will be synchronized with the counters at the other stations.

It will be noted that synchronization can occur in two ways in the system, namely, by resetting all of the address counters to an initializing level upon detection of a collision, and by setting the counters to a count corresponding to the address of a transmitting station. Of these two possibilities, the setting of the counters in response to the transmitting station address is preferred because it does not disrupt the normal order in which the stations can obtain access to the data link. This gives each station equal access to the system for purposes of transmission. The resetting of the counters upon detection of a collision is also important, however, because it automatically restores the system to synchronization in the event of a problem.

The invention has a number of important features and advantages. It provides synchronization between a plurality of processors in a network without requiring the transmission of special synchronization signals between the processors. Synchronization is achieved in a manner which gives all of the processors substantially equal access to the data link for purposes of transmission.

It is apparent from the foregoing that a new and improved system and method for controlling the transfer of data between a plurality of processors in a network have been provided. While only certain presently preferred embodiments have been described in detail, as will be apparent to those familiar with the art, certain changes and modifications can be made without departing from the scope of the invention as defined by the following claims.

What is claimed is:

1. In a system for selectively transferring data over a data link between a plurality of stations: transmitting means at each of said stations for transmitting data over the data link when enabled, receiving means at each of said stations for receiving data over the data link when enabled, means defining a unique address for each of said stations, an address counter at each of said stations, means operating asynchronously of each other at the respective stations for stepping the address counters in a predetermined sequence, means at each of the stations for enabling the transmitting means at each of the stations to transmit data including a transmitting station address and a receiving station address when the count in the address counter at the station corresponds to the unique address of the station, means responsive to the transmitted transmitting station address for setting the address counters at all of the stations to a count corresponding to the transmitted transmitting station address, means responsive to the receiving station address for enabling the receiving means at the station whose unique address is transmitted to receive the transmitted data, and means for resetting all of the address counters to a predetermined count upon detection of the concurrent presence of signals from the transmitting means at two of the stations on the data link.

2. The system of claim 1 wherein the means for setting the address counters includes means for setting the counters to a count one greater than the transmitted transmitting station address.

3. The system of claim 1 including means at each of the stations responsive to the presence of data on the data link for inhibiting the address counters from stepping until a termination signal is received, and means at the transmitting station for transmitting a termination signal over the data link upon completion of its transmission.

4. In a method of selectively transferring data over a data link between a plurality of stations, each having a data transmitter and a data receiver, the steps of: assigning a unique address to each of the stations, asynchronously stepping address counters at the stations in a predetermined sequence, transmitting data including a receiving station address and a transmitting station address over the data link from one of the stations when the count in the address counter at that station corresponds to the address of the station, setting the address counters at all of the stations to a count corresponding to the transmitted transmitting station address, enabling the receiving means at the station whose address is equal to the transmitted receiving station address to receive the transmitted data, and resetting the the counters to a predetermined count when signals from more than one station are detected on the data link.

5. The method of claim 4 including the steps of inhibiting the address counters from stepping when data is present on the data link until a termination signal is received, and transmitting a termination signal from the transmitting station at the end of a transmission.

6. The method of claim 4 wherein the count to which the address counters are set is one count greater than the transmitted address.

* * * * *